United States Patent
Tsujimoto

(10) Patent No.: US 9,467,590 B2
(45) Date of Patent: Oct. 11, 2016

(54) IMAGE PROCESSING SYSTEM, DEVICE, AND METHOD THAT DELETES OR PROHIBITS READING OF DESTINATION INFORMATION

(71) Applicant: Sharp Kabushiki Kaisha, Osaka (JP)

(72) Inventor: Kunihiko Tsujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 16 days.

(21) Appl. No.: 14/367,398

(22) PCT Filed: Dec. 13, 2012

(86) PCT No.: PCT/JP2012/082275
§ 371 (c)(1),
(2) Date: Jun. 20, 2014

(87) PCT Pub. No.: WO2013/094500
PCT Pub. Date: Jun. 27, 2013

(65) Prior Publication Data
US 2014/0327787 A1    Nov. 6, 2014

(30) Foreign Application Priority Data
Dec. 21, 2011    (JP) .................................. 2011-280252

(51) Int. Cl.
*H04N 1/32* (2006.01)
*H04N 1/00* (2006.01)
*H04N 1/333* (2006.01)

(52) U.S. Cl.
CPC ...... *H04N 1/32112* (2013.01); *H04N 1/00251* (2013.01); *H04N 1/00307* (2013.01); *H04N 1/00312* (2013.01); *H04N 1/00315* (2013.01); *H04N 1/00318* (2013.01); *H04N 1/00328* (2013.01); *H04N 1/33376* (2013.01);

(Continued)

(58) Field of Classification Search
None
See application file for complete search history.

(56) References Cited

U.S. PATENT DOCUMENTS 7,644,119 B1   1/2010   Anooshfar
8,553,256 B2 *  10/2013   Ohara ................. H04N 1/00222
                                                    358/1.13

(Continued)

FOREIGN PATENT DOCUMENTS

JP    2001-274943    10/2001
JP    2003-087878    3/2003

(Continued)

OTHER PUBLICATIONS

International Search Report for corresponding International Application No. PCT/JP2012/082275 mailed Mar. 5, 2013.

*Primary Examiner* — Scott A Rogers
(74) *Attorney, Agent, or Firm* — Renner, Otto, Boisselle & Sklar, LLP

(57) ABSTRACT

An information terminal device which is an image receiving device receiving image data from a multifunction device which is an image processing device transmits setting information such as resolution, color/monochrome setting and data format for generating image data to be received, and destination information of the information terminal device itself to the multifunction device, as a profile. The multifunction device receives the profile, generates image data of an image read based on the setting information of the received profile when scanning is executed, and automatically transmits the image data to the information terminal device based on the destination information of the profile.

7 Claims, 22 Drawing Sheets

(52) U.S. Cl.
CPC . *H04N2201/326* (2013.01); *H04N 2201/3208* (2013.01); *H04N 2201/3242* (2013.01); *H04N 2201/3278* (2013.01)

(56) References Cited

U.S. PATENT DOCUMENTS

| | | | |
|---|---|---|---|
| 8,873,092 B2* | 10/2014 | Ohhashi | G06F 3/122 |
| | | | 258/1.15 |
| 8,902,475 B2* | 12/2014 | Kino | H04N 1/00222 |
| | | | 358/1.13 |
| 8,941,869 B2* | 1/2015 | Kida | G06F 3/1296 |
| | | | 358/1.14 |
| 9,026,103 B2* | 5/2015 | Tokumaru | H04W 12/06 |
| | | | 455/414.1 |
| 2005/0146755 A1 | 7/2005 | Shimokawa et al. | |
| 2007/0253035 A1 | 11/2007 | Takesada | |
| 2011/0063645 A1 | 3/2011 | Sugino | |
| 2015/0146242 A1* | 5/2015 | Tsujimoto | H04N 1/00233 |
| | | | 358/1.15 |

FOREIGN PATENT DOCUMENTS

| | | |
|---|---|---|
| JP | 2005-311485 A | 11/2005 |
| JP | 2007-243939 | 9/2007 |
| JP | 2007-300480 | 11/2007 |
| JP | 2010-130656 | 6/2010 |
| JP | 2011-087280 A | 4/2011 |

* cited by examiner

F I G. 1
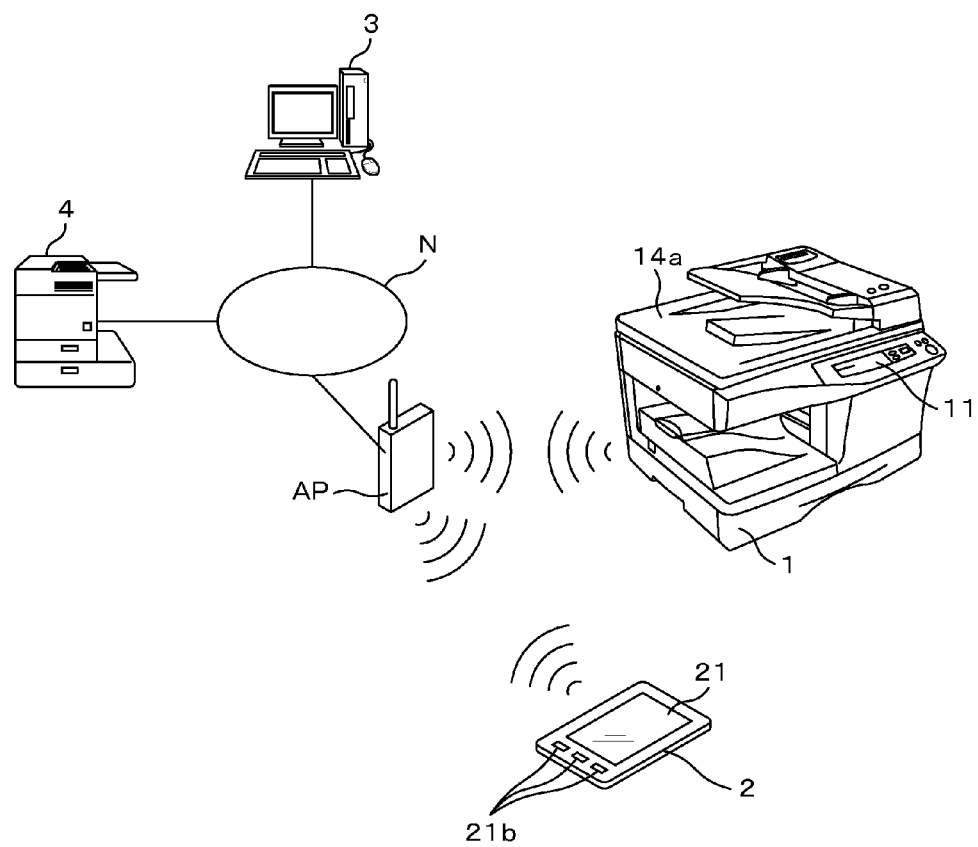

F I G. 6
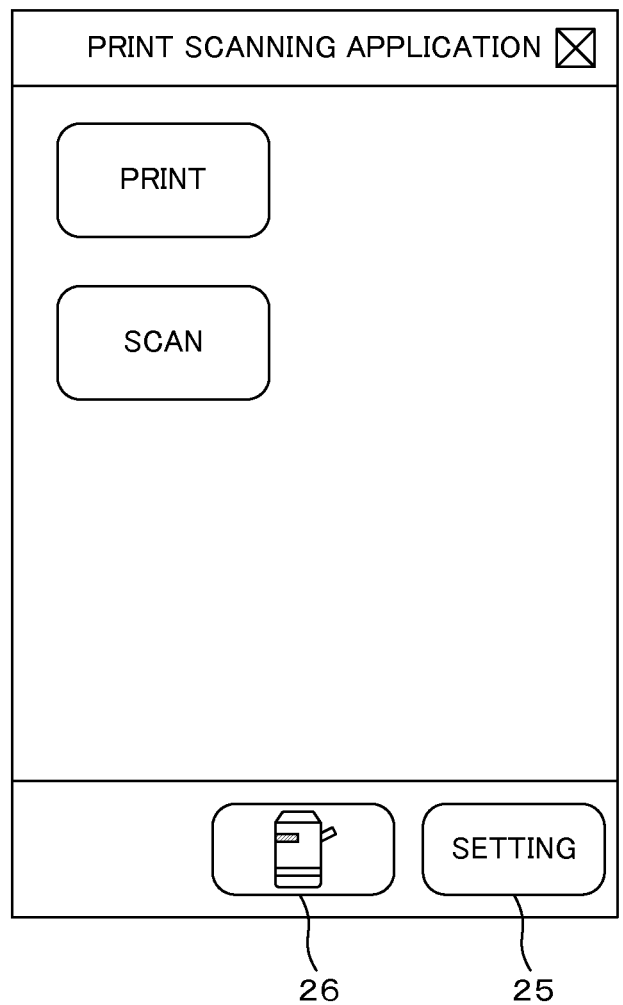

F I G. 9
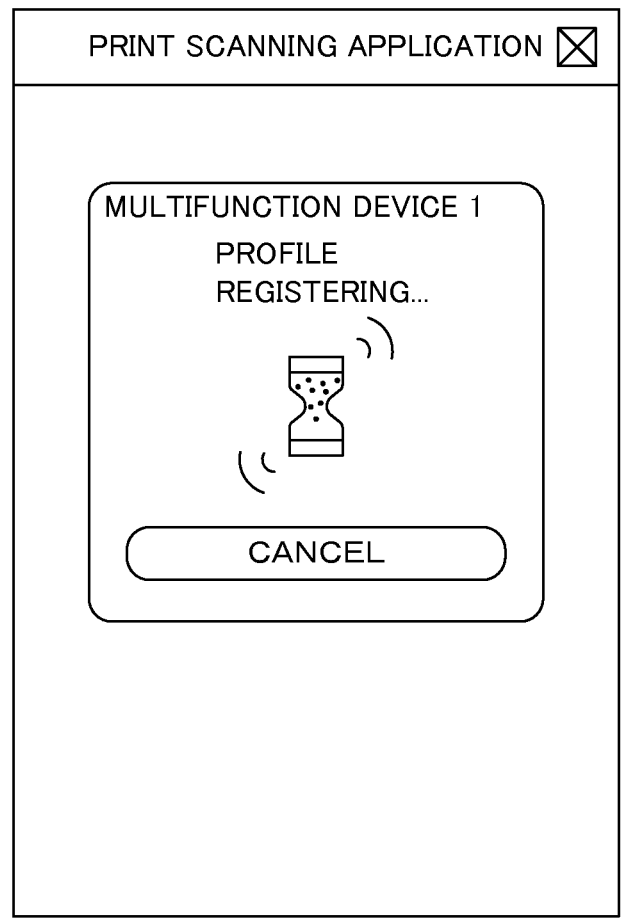

F I G. 1 0
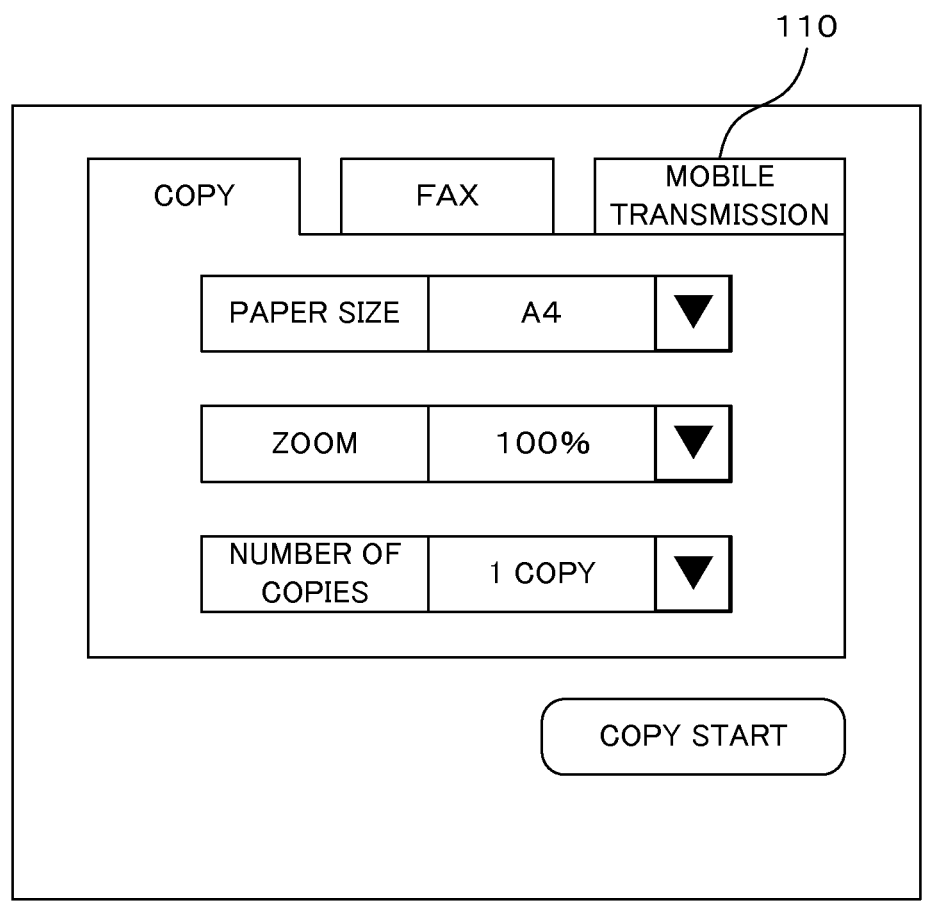

F I G. 1 1
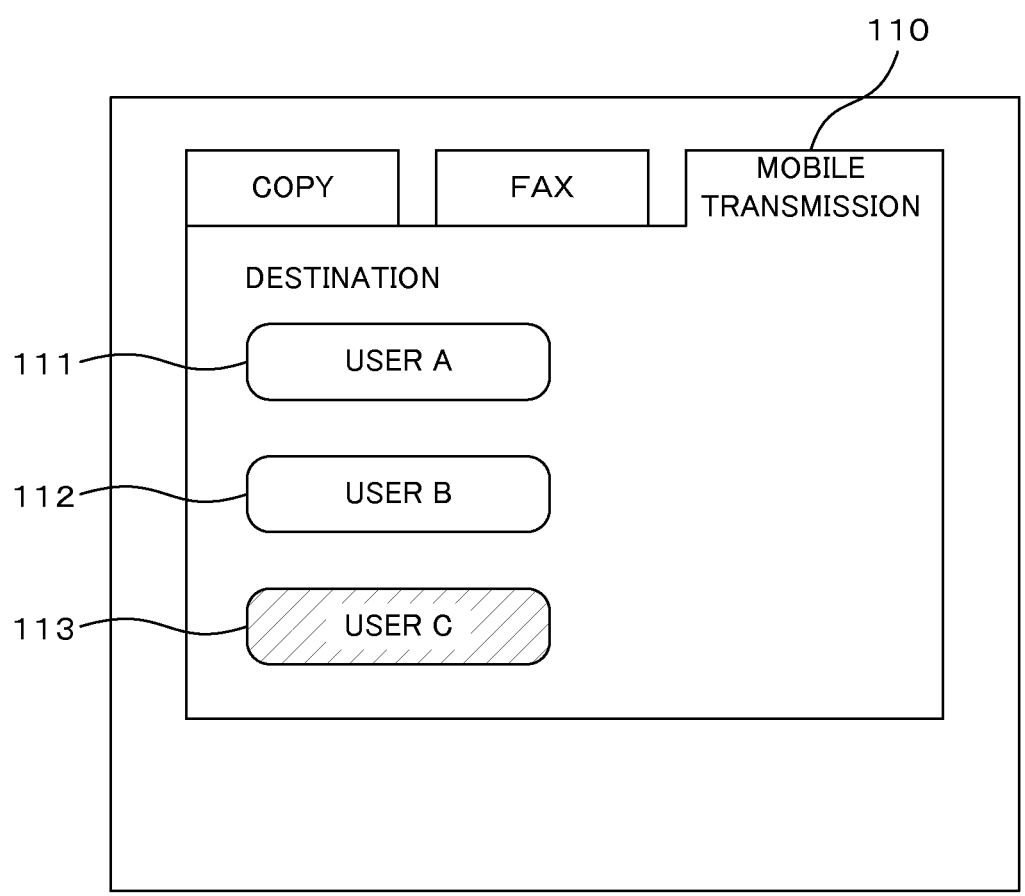

F I G. 1 2
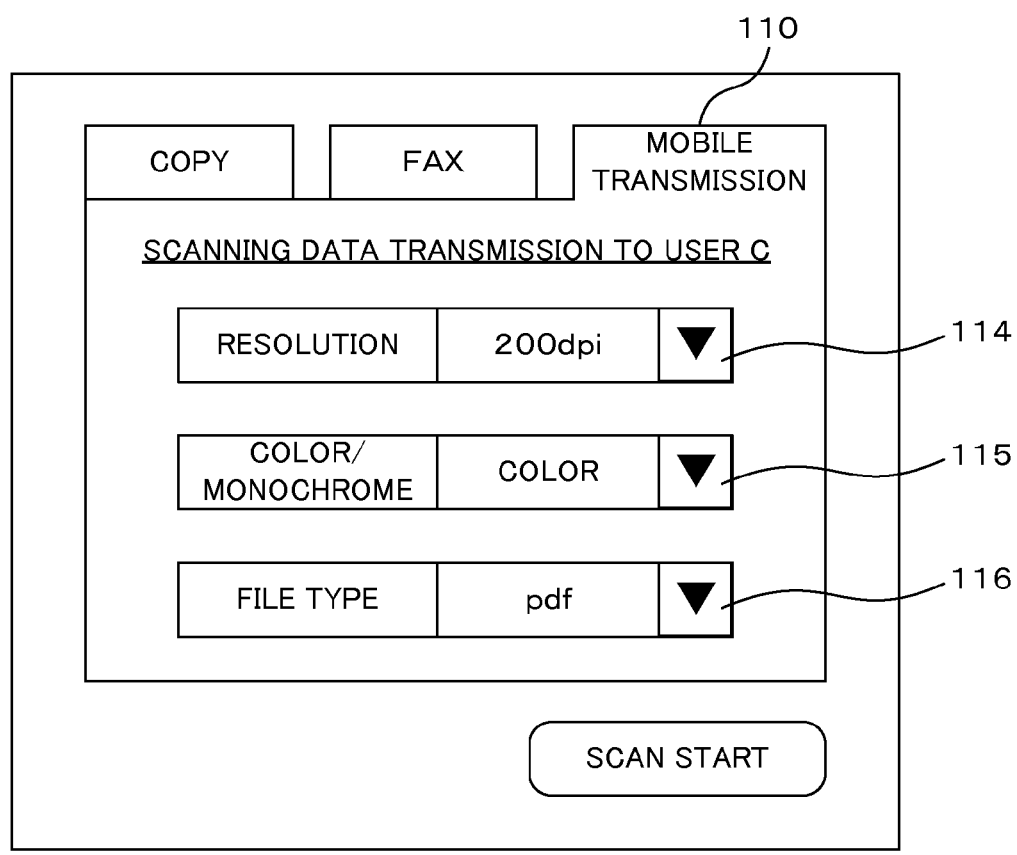

F I G. 1 3
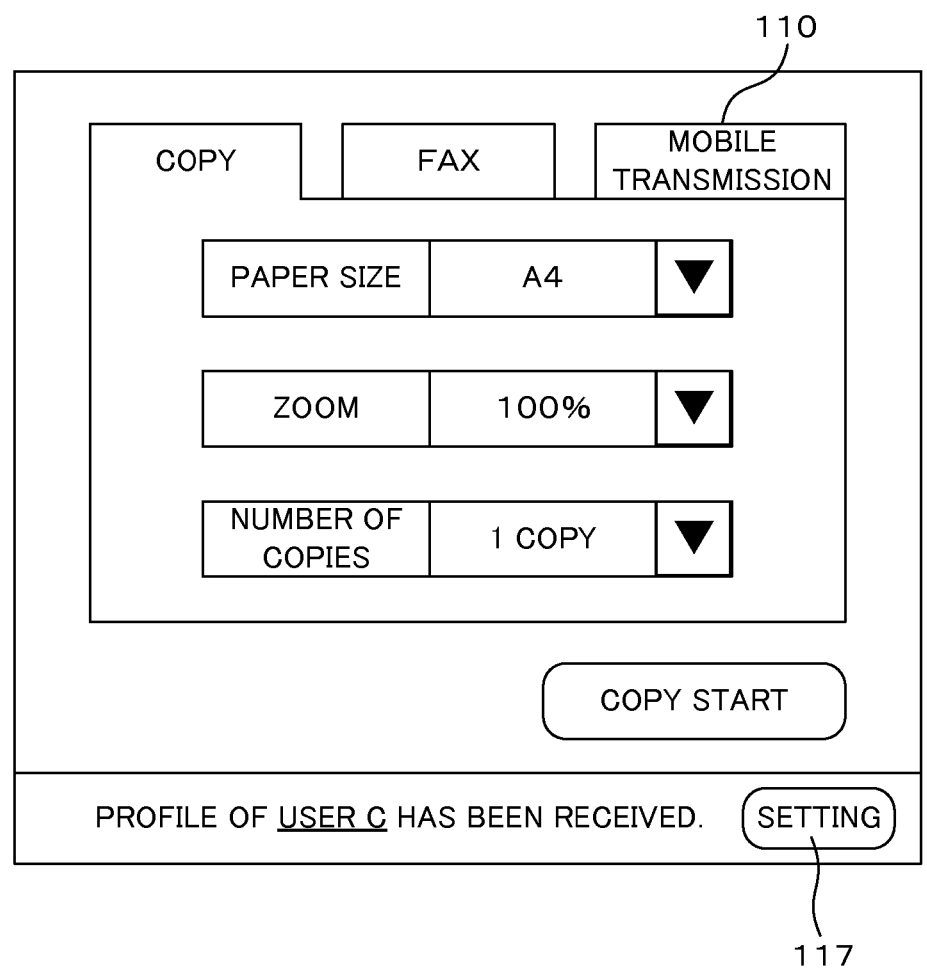

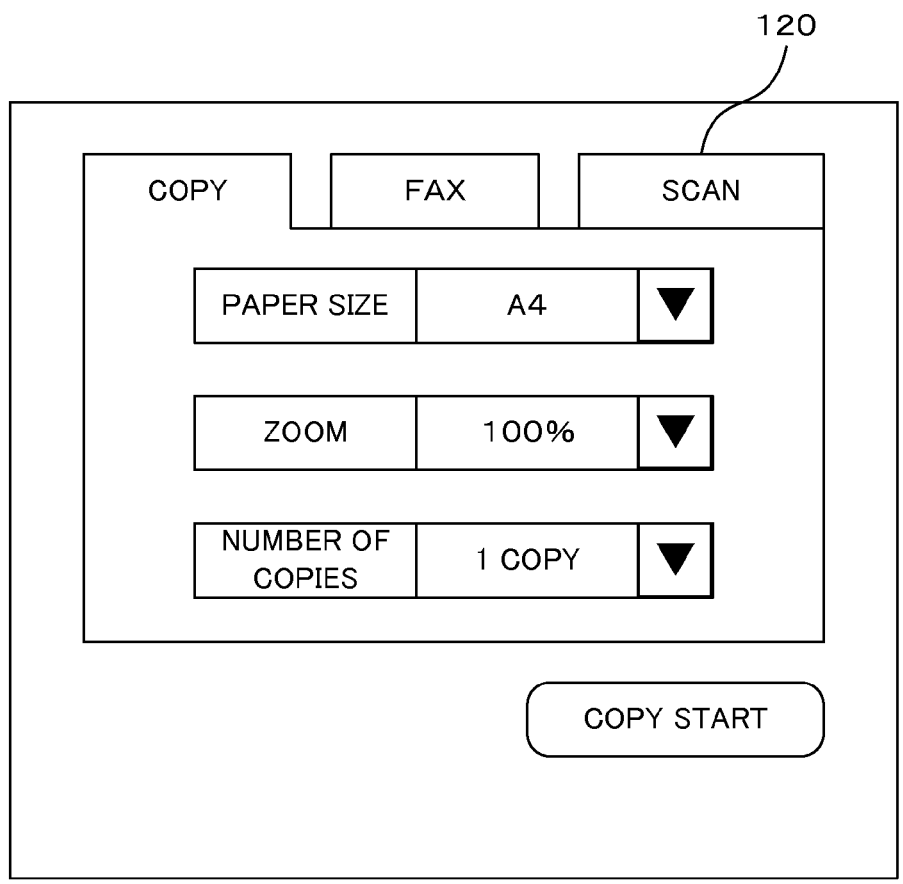
F I G. 1 9

F I G. 2 1
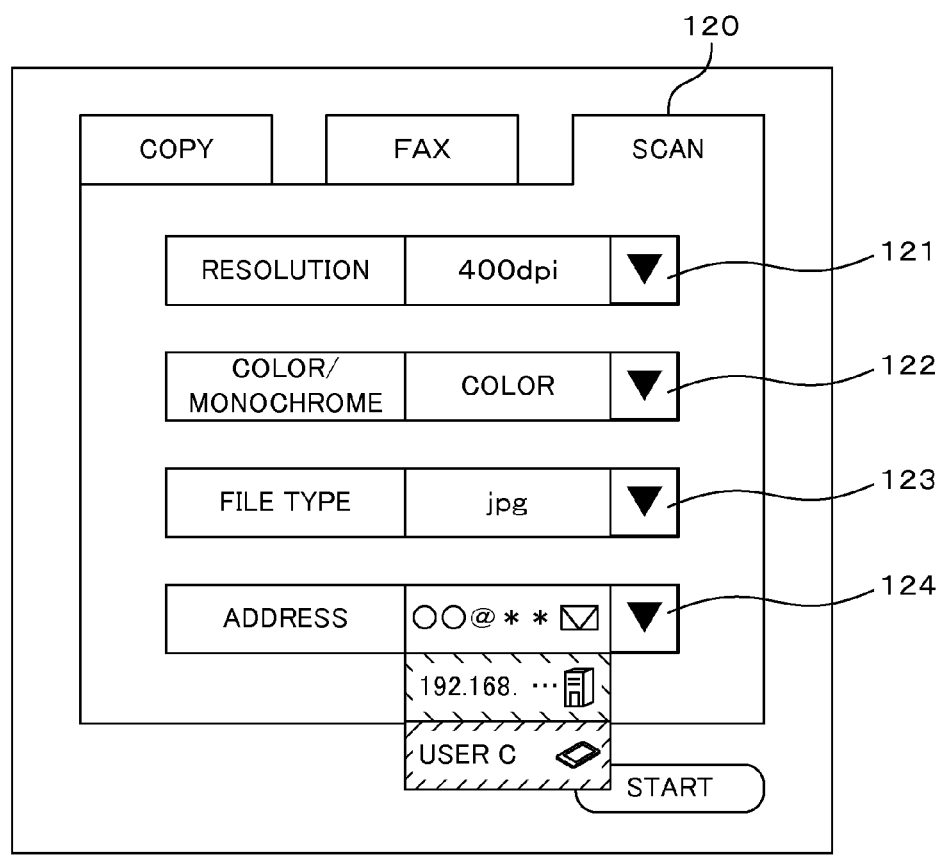

IMAGE PROCESSING SYSTEM, DEVICE, AND METHOD THAT DELETES OR PROHIBITS READING OF DESTINATION INFORMATION

CROSS-REFERENCE TO RELATED APPLICATION

This application is the national phase under 35 U.S.C. §371 of PCT International Application No. PCT/JP2012/082275 which has an International filing date of Dec. 13, 2012 and designated the United States of America.

BACKGROUND

1. Technical Field

The present invention relates to an image processing system in which an information terminal device and an image processing device transmit and receive image data by wireless communication. More specifically, the present invention relates to: an image processing system capable of simplifying operation of a user and reducing operation time; an image receiving device and image processing device configuring the image processing system; and an image processing method.

2. Description of Related Art

Portable information terminal devices, so-called smartphones, have widely been used. Such an information terminal device is highly convenient, since it is able to have various functions just for a user by adding different applications to the functions of a camera, game, media player and the like.

Recently, in business enterprises and households, such techniques have been widespread that a portable information terminal device is connected via wireless communication to a local network connected with or without wire to a multifunction device and a personal computer, and transmits/receives information to/from the multifunction device or personal computer. Among them, users have demanded a function enabling an information terminal device with a camera function to transmit image data via wireless communication to a multifunction device and enabling the multifunction device to print out the image data without intermediary of an USB cable and a personal computer, or, to the contrary, a function enabling an information terminal device to receive image data obtained by scanning a printed material from a multifunction device.

Japanese Patent Application Laid-Open No. 2003-087878 discloses an invention in which setting data for the user of a device to be operated, such as a multifunction device, is stored in a storage unit of a portable communication device held by the user, the setting data is transmitted from the portable communication device to the device to be operated when the portable communication device approaches the device to be operated, and an operation screen for the user is displayed at the device to be operated.

Moreover, Japanese Patent Application Laid-Open No. 2007-300480 discloses an invention in which a one-touch key for the user and an address book are temporarily displayed on the image processing device (MFP: Multi-Function Peripheral) connected to the same LAN when the user dragged and dropped a setting file into a setting screen in the Web browser on a client PC (Personal Computer) connected to LAN.

SUMMARY

Since direct communication has been implemented between a portable information terminal device and a multifunction device, the need has arisen for simplifying the procedure and reducing the time for operation by the user. The inventions disclosed in Japanese Patent Application Laid-Open No. 2003-087878 and Japanese Patent Application Laid-Open No. 2007-300480 can only display an operation screen set for the user, who still needs to conduct further setting operation. Such techniques can thus be regarded as insufficient for the recently-demanded simplification of operation procedures.

The present invention has been made with the aim of solving the above problems. It is an object of the present invention to provide: an image processing system that can further improve operability by more simplifying the user's operation and by reducing the time required for operation; an image receiving device and an image processing device configuring the image processing system; and an image processing method.

An image processing system according to the present invention comprises: one or more image processing devices provided with generating means for generating image data and communication means, and transmitting the generated image data through the communication means; and an image receiving device provided with communication means and receiving the generated image data transmitted by the image processing device through the communication means. The image processing system is characterized in that the image receiving device includes: means for obtaining destination information of itself; means for obtaining setting information for generating image data to be received; and means for transmitting, through the communication means, the obtained destination information and setting information to one of the image processing devices. The image processing system is characterized in that the image processing device includes: means for receiving, through the communication means, the destination information and setting information transmitted from the image receiving device; the generating means for generating image data based on the received setting information; and means for transmitting, through the communication means, the generated image data to a destination indicated by the received destination information.

The image processing system according to the present invention comprises a plurality of the image processing devices. The image processing system is characterized in that the image receiving device further includes: means for searching for an image processing device which is capable of communicating through the communication means and of generating image data based on the setting information; means for outputting a result of searching; and means for accepting a selection of an image processing device from the output result of searching.

An image receiving device according to the present invention, includes communication means and receives image data through the communication means. The image receiving device is characterized by comprising: means for obtaining destination information of the image receiving device itself; means for obtaining setting information for generating image data to be received by itself; and means for transmitting, through the communication means, the obtained destination information and setting information.

The image receiving device according to the present invention is characterized by further comprising means for transmitting a request for deleting the transmitted destination information and setting information.

The image receiving device according to the present invention is characterized by further comprising: means for searching for a device capable of communicating through the communication means and of generating image data based on the obtained setting information; means for outputting a result of searching; and means for accepting a selection of a device from the output result of searching.

An image processing device according to the present invention, includes means for generating image data and communication means, and transmits the generated image data through the communication means. The image processing device is characterized by comprising: means for receiving, through the communication means, destination information of image data and setting information for generating image data; means for generating image data by the generating means based on the received setting information; and means for transmitting, through the communication means, generated image data to a destination indicated by the received destination information.

The image processing device according to the present invention is characterized by further comprising: storage means for storing the received setting information; and means for deleting or prohibiting reading of the setting information from the storage means after a predetermined period of time has elapsed since generating image data based on the setting information or transmitting the image data.

The image processing device according to the present invention is characterized by further comprising: storage means for storing the received destination information; and means for deleting or prohibiting reading of the destination information from the storage means after a predetermined period of time has elapsed since generated image data is transmitted to a destination indicated by the destination information.

The image processing device according to the present invention is characterized by further comprising: means for receiving, through the communication means, a request for deleting the setting information or destination information; and means for deleting or prohibiting reading of the setting information or the destination information from the storage means, when the request for deleting is received, after a predetermined period of time has elapsed from the reception.

An image processing method according to the present invention, is an image processing method in which one or more image processing devices provided with generating means for generating image data and communication means transmits the generated image data through the communication means, and an image receiving device provided with communication means receives the generated image data transmitted by the image processing device through the communication means. The image processing method is characterized in that the image receiving device obtains destination information of itself, obtains setting information for generating image data to be received, and transmits the obtained destination information and setting information to one of the image processing devices through the communication means. The image processing method is characterized in that the image processing device receives the destination information and setting information transmitted from the image receiving device through the communication means, makes the generating means generate image data based on the received setting information, and transmits the generated image data to a destination indicated by the received destination information through the communication means.

According to the present invention, destination information of the image receiving device itself as well as setting information used for generating an image are transmitted from the image receiving device receiving generated image data to the image processing device. In the image processing device, image data is generated based on setting information set at the image receiving device to which generated image data is to be transmitted, and is transmitted to the image receiving device. In the image generating device, it is not necessary to conduct setting for generating an image to correspond to the image receiving device to which the image is transmitted. Examples of the setting information may include resolution at reading of an image, color/monochrome setting or a format of image data.

According to the present invention, an image processing device capable of generating an image is searched for based on the setting information obtained at the image receiving device, and can be selected. It is not necessary for the user to operate each image processing device to look for the image processing device capable of communicating with the image receiving device and of generating image data with desired setting.

According to the present invention, the destination information transmitted from the image receiving device or setting information which is required for generating image data is deleted or prohibited to be read from the image processing device. The timing at which such information is deleted or prohibited to be read out may be timing where the information becomes unnecessary, that is, for the setting information, it may be at any timing as long as generation of image data is completed, for example, immediately after generation of image data (a predetermined period of time is zero) or after transmission of image data is completed or a predetermined period of time has elapsed. As for the destination information, the timing may be, for example, immediately after completing transmission of image data (a predetermined period of time is zero) or after a further period of time has elapsed. Accordingly, the destination information or setting information corresponding to the image receiving device connected temporarily may appropriately be deleted, which can avoid excessive information being stored in the image processing device.

According to the present invention, for deleting or prohibiting reading out of the destination information transmitted from the image receiving device or the setting information for generating image data, a request for deleting is transmitted from the image receiving device. In the image processing device, only when the request for deleting is received, the destination information or setting information is deleted after a predetermined period of time (including zero) has elapsed from the reception. The request for deleting may be transmitted at once for both the destination information and setting information.

According to the present invention, setting information which is required to generate desired image data is transmitted from the image receiving device which is to receive image data. In the image processing device, therefore, image data may basically be generated based on the received setting information. It is thus not necessary for the user to conduct operation for setting in the image generating device to correspond to the image receiving device every time image data is generated. This allows the user to receive, store and view the image data generated with the setting automatically corresponding to the image receiving device for receiving data. It is thus possible to simplify user's operation and to reduce operation time, which can improve operability.

The above and further objects and features will more fully be apparent from the following detailed description with accompanying drawings.

BRIEF DESCRIPTION OF THE SEVERAL VIEWS OF THE DRAWINGS

FIG. 1 is a schematic view schematically illustrating a configuration of an image processing system according to an embodiment of the present invention;

FIG. 6 is an explanatory view illustrating an example of a main screen of a print scanning application;

FIG. 9 is an explanatory view illustrating an example of a screen showing that registering of a profile is being requested;

FIG. 10 is an explanatory view illustrating an example of a main screen displayed on a display unit of the multifunction device;

FIG. 11 is an explanatory view illustrating an example of an operation screen for "mobile transmission";

FIG. 12 is an explanatory view illustrating an example of display of setting information;

FIG. 13 is an explanatory view illustrating another example of the main screen of the multifunction device;

FIG. 19 is an explanatory view illustrating another example of the main screen displayed on the display unit of the multifunction device;

FIG. 21 is an explanatory view illustrating an example of a screen on which options in a pull-down menu in FIG. 20 are shown.

DETAILED DESCRIPTION

The present invention will specifically be described below with reference to the drawings illustrating the embodiments thereof.

Figure 2:
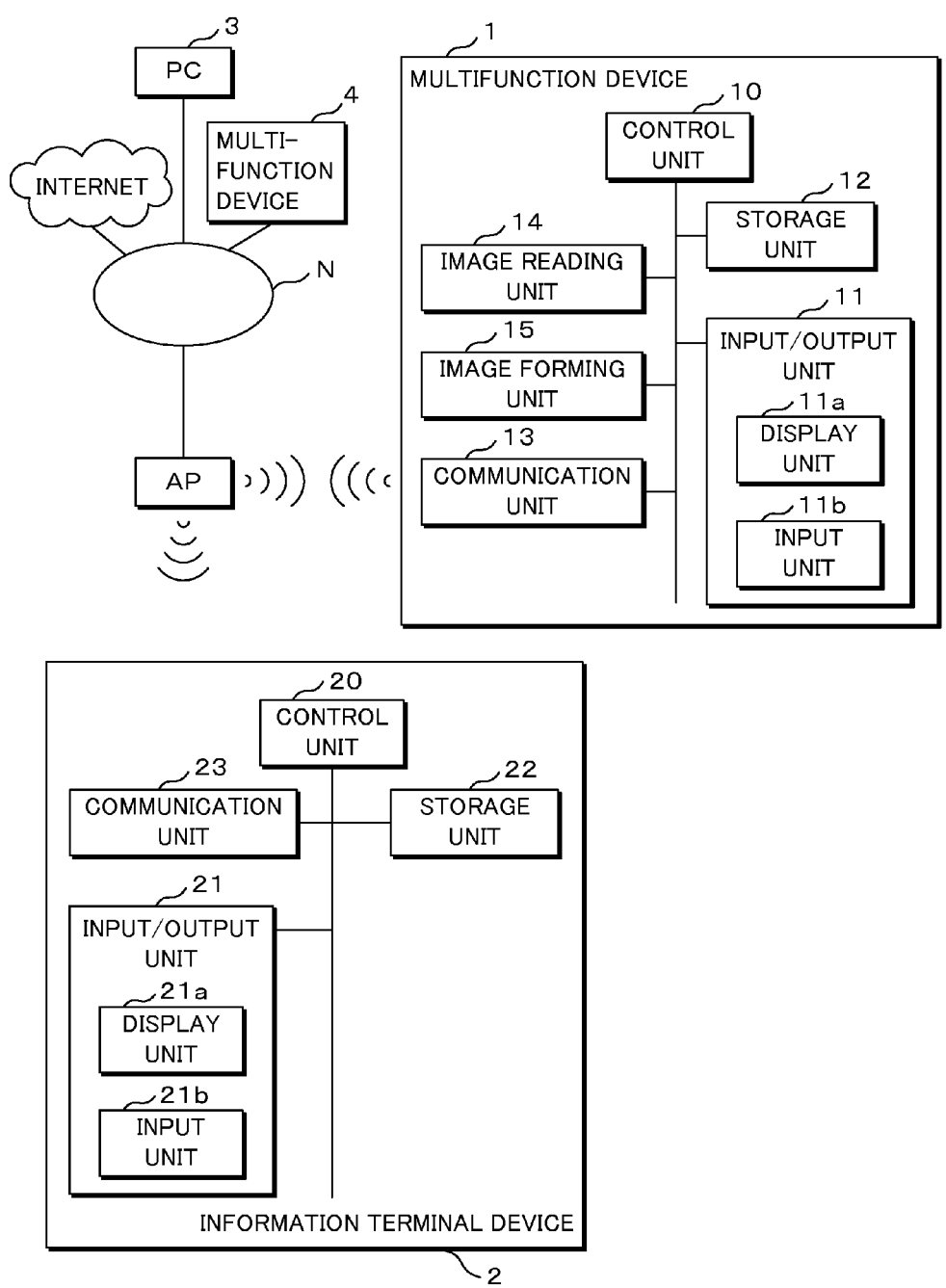
FIG. 2 is a block view illustrating the configuration of the image processing system according to the embodiment.

FIG. 1 is a schematic view schematically illustrating a configuration of an image processing system according to an embodiment of the present invention. FIG. 2 is a block view illustrating the configuration of the image processing system according to the present embodiment. The image processing system includes a multifunction device 1 and an information terminal device 2 connected via an access point AP to a network N which is an in-office or in-house LAN. The network N is connected to, in addition to the multifunction device 1 and information terminal device 2, a PC 3 or another multifunction device 4. The network N may also be connected to an external Internet network.

According to the present invention, when image data read by implementing scanning at the multifunction device 1 is transmitted through wireless communication from the multifunction device 1 to the information terminal device 2, the operation procedures by the user in the multifunction device 1 and information terminal device 2 can be simplified.

The multifunction device 1 is an image processing device provided with a printer function, scanner function, facsimile function, electronic mail communication function and the like. The multifunction device 1 includes a control unit 10 controlling each of configuration units, an input/output unit 11 using a touch panel and an LCD (Liquid Crystal Display), a storage unit 12 storing various types of information, a communication unit 13 realizing communication with the information terminal device 2, an image reading unit 14 realizing the scanner function, and an image forming unit 15 realizing the printer function.

The control unit 10 uses a CPU (Central Processing Unit) to control each of the configuration units based on control programs stored in a built-in ROM (Read Only Memory).

The input/output unit 11 includes a display unit 11a using an LCD and an input unit 11b using a touch panel. For the input unit 11b, not only a touch panel but a hardware key may also be used. With respect to the display unit 11a showing various kinds of icons or buttons, the input unit 11b detects the position on the touch panel touched by the user and, based on the information of the position touched by the user and the positional information of an icon or a button shown on the display unit 11a, the control unit 10 is able to identify which icon or button has been touched by the user. It is also possible for the control unit 10 to identify which hardware key has been pressed.

The storage unit 12 uses an HDD (Hard Disk Drive) or an SSD (Solid State Drive). The storage unit 12 stores address information of a destination used when image data is transmitted to the information terminal device 2. Note that the storage unit 12 may also store in advance address information for the facsimile function, electronic mail communication function and FTP (File Transfer Protocol) communication function. The storage unit 12 may also store, for example, image data read by the image reading unit 14 or image data received through the communication unit 13.

The communication unit 13 realizes a wireless communication function. The control unit 10 is able to transmit and receive data, through the communication unit 13, to/from the information terminal device 2 and other communication devices connected to the network N via the access point AP.

For the image reading unit 14, a scanner unit is used. The scanner unit is a reading device for optically reading a document placed on a scanning table 14a or a document tray, and includes, inside the main body of the multifunction device 1, an optical unit as well as a control unit for controlling reading operation performed by the optical unit. The image reading unit 14 outputs image data obtained by reading a document to a predetermined image memory, so that the control unit 10 can obtain the image data.

For the image forming unit 15, a printer unit is used. The printer unit is disposed below the scanner unit inside the main body of the multifunction device 1. The printer unit generates a toner image based on the image data sent from the control unit 10, and transfers the toner image onto a sheet of paper, to form an image.

The information terminal device 2 corresponds to a portable telephone machine, i.e. a so-called smartphone. The information terminal device 2 may also be a tablet PC (Personal Computer). Though the information terminal device 2 may be a PC or the like connected with wire, a portable information processing device provided with a wireless communication function would have a more significant effect by the processing which will be described later.

The information terminal device 2 is provided with a control unit 20 controlling each of the configuration units, an input/output unit 21 using a touch panel, a storage unit 22 storing various kinds of information, and a communication unit 23 realizing communication with the multifunction device 1 via the access point AP.

The control unit 20 uses a CPU to control each of the configuration units based on control programs stored in a built-in ROM.

The input/output unit 21 includes a display unit 21a using an LCD as well as an input unit 21b using a touch panel and a hardware key. With respect to the display unit 21a showing various kinds of icons or buttons, the input unit 21b detects the position on the touch panel touched by the user and notifies the control unit 20 of the information of the position touched by the user. The control unit 20 is able to identify which icon or button has been touched based on the positional information for the icons or buttons shown on the display unit 21a. Moreover, when a hardware key is pressed, the input unit 21b notifies the control unit 20 of information for identifying which key has been pressed.

For the storage unit 22, a RAM (Random Access Memory) and a flash memory are used. In the flash memory of the storage unit 22, an application program (hereinafter referred to as a print scanning application) used for performing print output of image data or document reading at the multifunction device 1 or 4 connected to the network N. The control unit 20 reads out and executes the print scanning application stored in the storage unit 22, to realize reception of image data from the multifunction device 1 and communication with the multifunction device 1, which will be described later. The control unit 20 temporarily stores the image data received through the communication unit 23 in the RAM of the storage unit 22, or in the flash memory for saving the data.

Furthermore, the storage unit 22 stores therein parameters such as setting for resolution, color/monochrome, a file type (format) and the like of the image data to be received, as setting information, so as to correspond to the print scanning application. The setting information is initially set and may later be edited by the user with the print scanning application. The setting information may also be stored individually for each of different multifunction devices.

The communication unit 23 realizes a wireless communication function. Based on the instructions from the control unit 20, the communication unit 23 becomes connected to the access point AP and to the network N. The control unit 20 is able to transmit and receive data, through the communication unit 23, to/from the multifunction device 1 and other communication devices connected to the network N via the access point AP.

In the image processing system as described above, the procedure performed when image data scanned at the multifunction device 1 is transmitted to the information terminal device 2 will now be described with reference to the flowchart and examples of operation screens.

Figure 3:
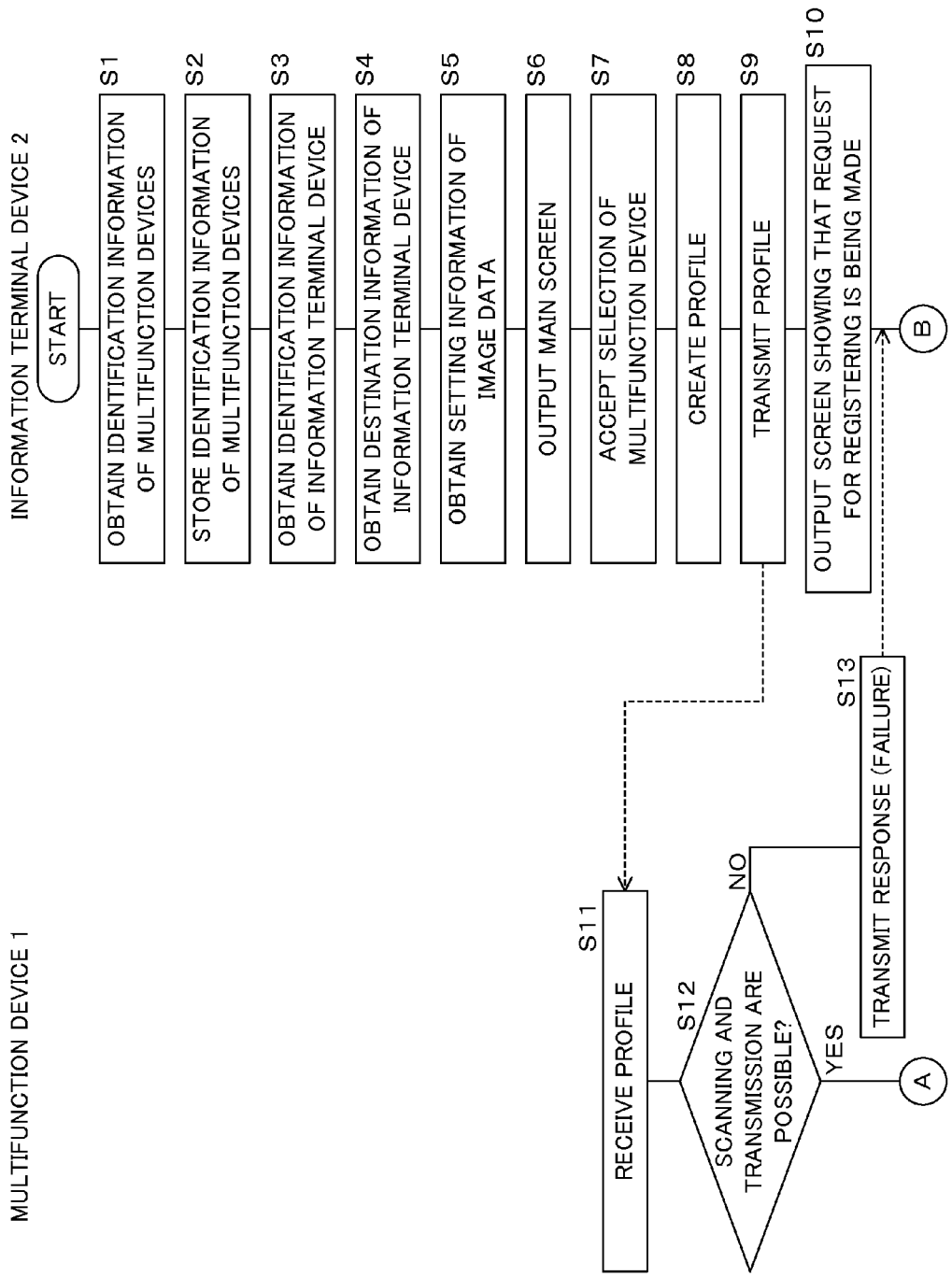
FIG. 3 is a flowchart illustrating an example of a processing procedure at scanning according to the embodiment.
Figure 4:
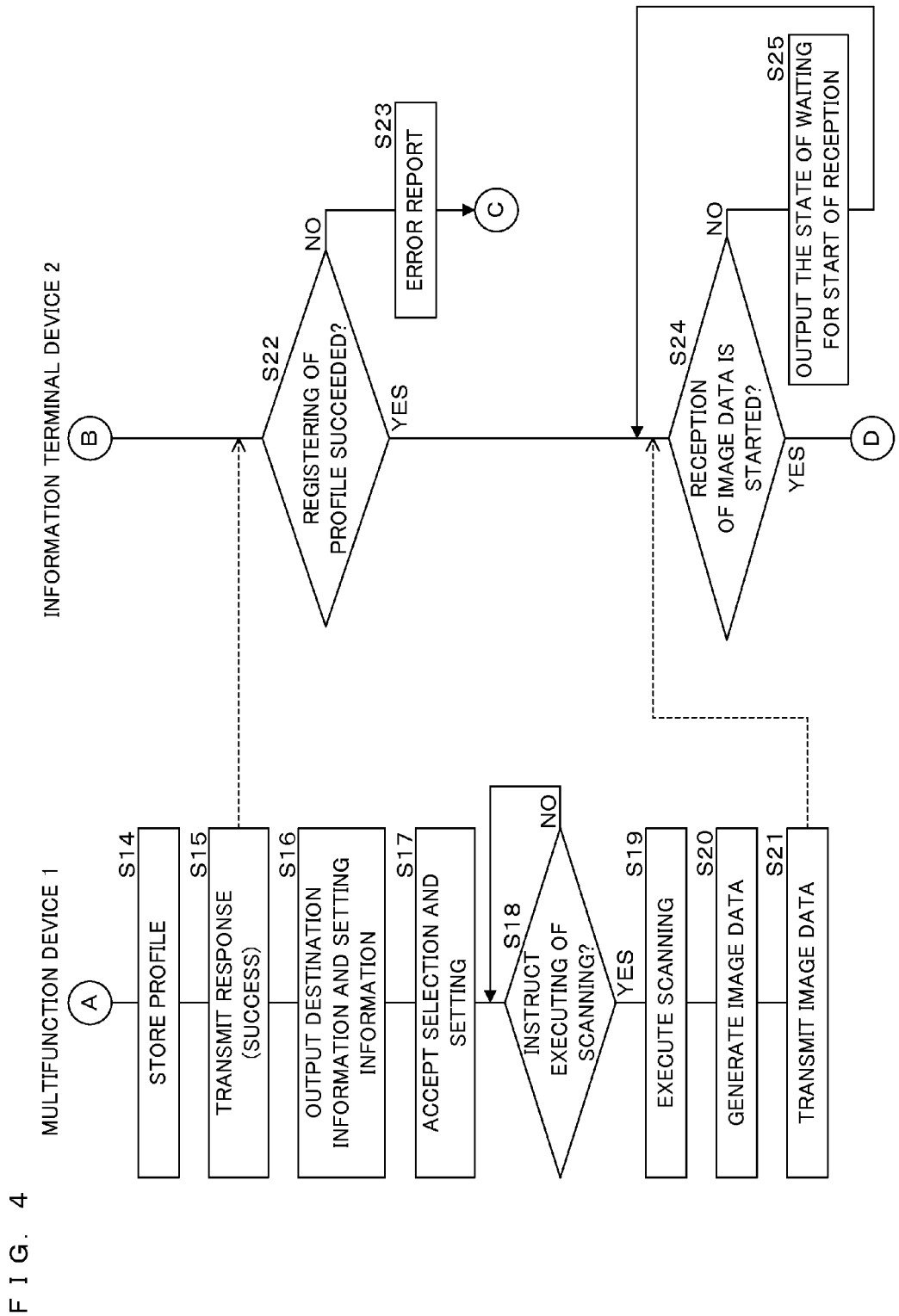
FIG. 4 is a flowchart illustrating an example of a processing procedure at scanning according to the embodiment.
Figure 5:
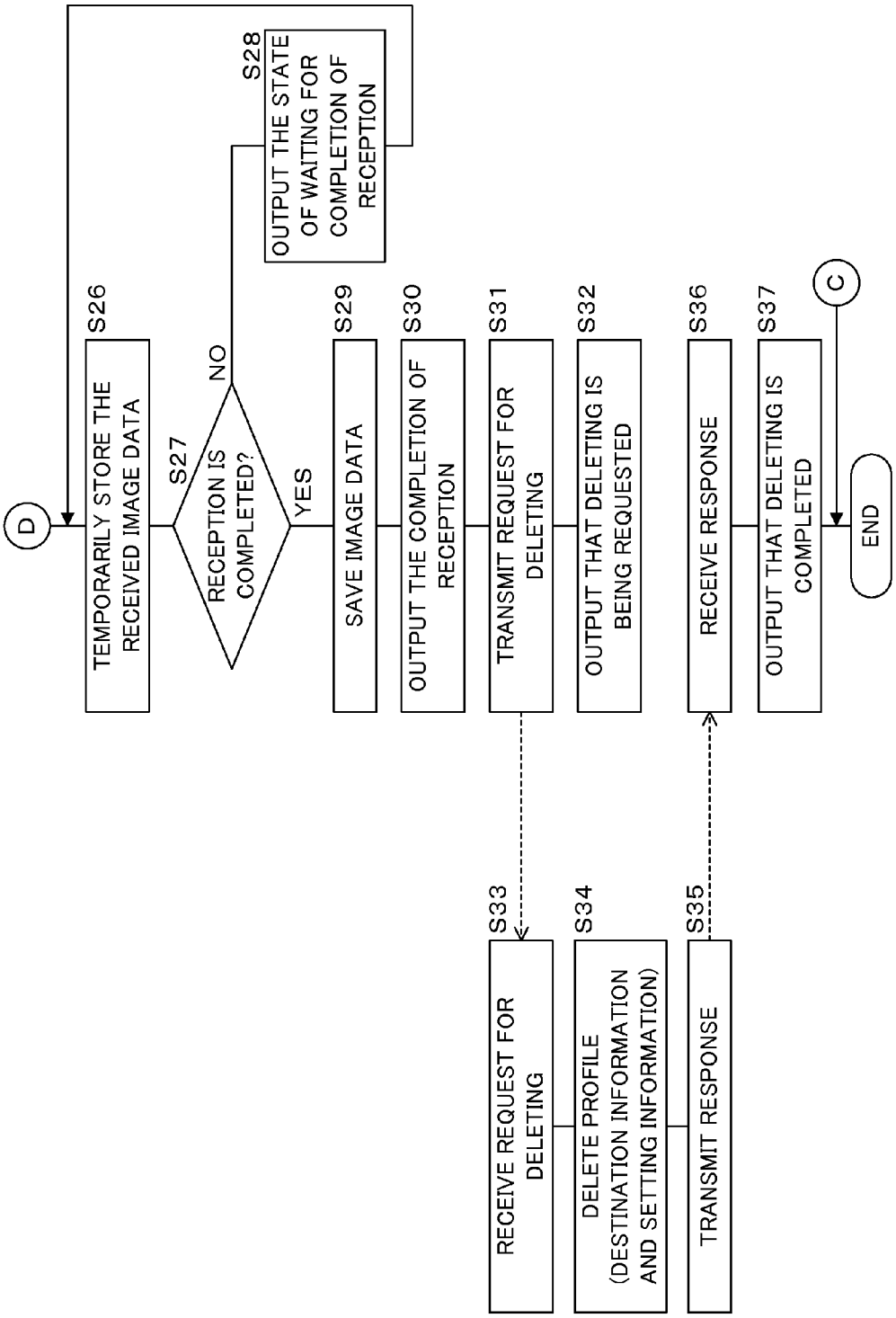
FIG. 5 is a flowchart illustrating an example of a processing procedure at scanning according to the embodiment.

FIGS. 3, 4 and 5 are flowcharts illustrating an example of a processing procedure performed when scanning is executed according to the present embodiment. In the state where the multifunction device 1 is connected to the network N and can communicate with the devices connected to the network N, when the control unit 20 of the information terminal device 2 reads out and starts the print scanning application in response to the operation by the user, the processing as described below will be executed.

The control unit 20 of the information terminal device 2 obtains, through the communication unit 23, identification information (name of device, IP address) specifying each of the multifunction devices 1 and 4 connected to the network N (step S1).

At step S1, more specifically, for example, the control unit 20 broadcasts, to the devices connected to the network N, a command for requesting transmission of information indicating the type of each device itself as a search command, through the communication unit 23. The control unit 20 extracts, based on a response to the search command, each of the multifunction devices 1 and 4 that returned responses indicating that they are multifunction devices, and obtains the IP addresses for the multifunction devices 1 and 4. Alternatively, the control unit 20 may make the display unit 21a display an input screen for inputting the IP address of the multifunction device 1 (default multifunction device) when the print scanning application is started, detect a character input to the input screen at the input unit 21b, and obtain an IP address.

The control unit 20 stores the identification information of the multifunction devices 1 and 4 obtained at step S1 in the storage unit 22 (step S2). The control unit 20 may also function to obtain the stored identification information when the print scanning application is started the next time.

Subsequently, the control unit 20 obtains information for identifying a user (user name, ID or electronic mail address, for example) from local information of the information terminal device 2, which is recorded in the storage unit 22 or another specific memory (step S3). The control unit 20 obtains, through the communication unit 23, the identification information (IP address) of the information terminal device 2 itself in the network N, i.e. destination information of itself (step S4).

The control unit 20 reads out, from the storage unit 22, setting information of image data to be received, and obtains the information (step S5).

The control unit 20 outputs a main screen corresponding to the print scanning application to the display unit 21a of the input/output unit 21 based on the information obtained at steps S1 to S4 (step S6), and accepts the selection of a multifunction device (step S7). It is noted that the timing for outputting the main screen is not limited to the one in step S6.

FIG. 6 is an explanatory view illustrating an example of the main screen of the print scanning application. As illustrated in FIG. 6, on the display unit 21a, for example, a setting icon 25 for displaying or editing user information and setting information, and a multifunction device icon 26 for displaying the list of connected multifunction devices are displayed.

Figure 7:
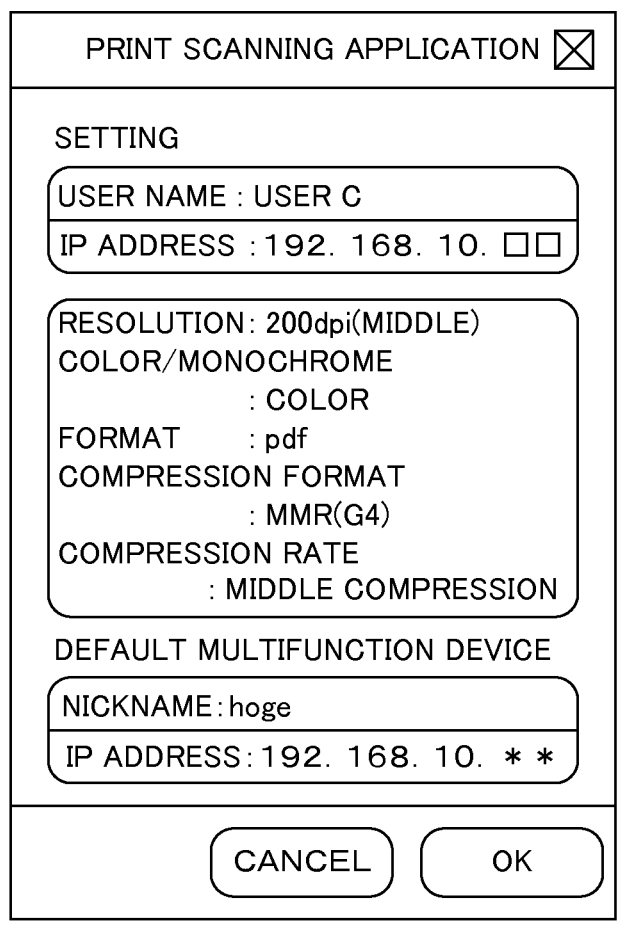
FIG. 7 is an explanatory view illustrating an example of a display screen for user information and setting information.

When the user touches the touch panel on the setting icon 25, details of the user information and setting information as well as a screen for accepting the editing are displayed. FIG. 7 is an explanatory view illustrating an example of a display screen for user information and setting information. As illustrated in FIG. 7, the name of the user of the information terminal device 2 obtained at step S3, and the IP address of the information terminal device 2 obtained step S4 are displayed. In the example shown in FIG. 7, as the setting information of the image data to be received by the information terminal device 2, the information of the compression format and compression rate are displayed in addition to the resolution, color/monochrome setting, and a format of image data. When the user touches a touch panel for each item, the control unit 20 outputs an input screen and obtains the input information. This allows the user to edit setting information.

Figure 8:
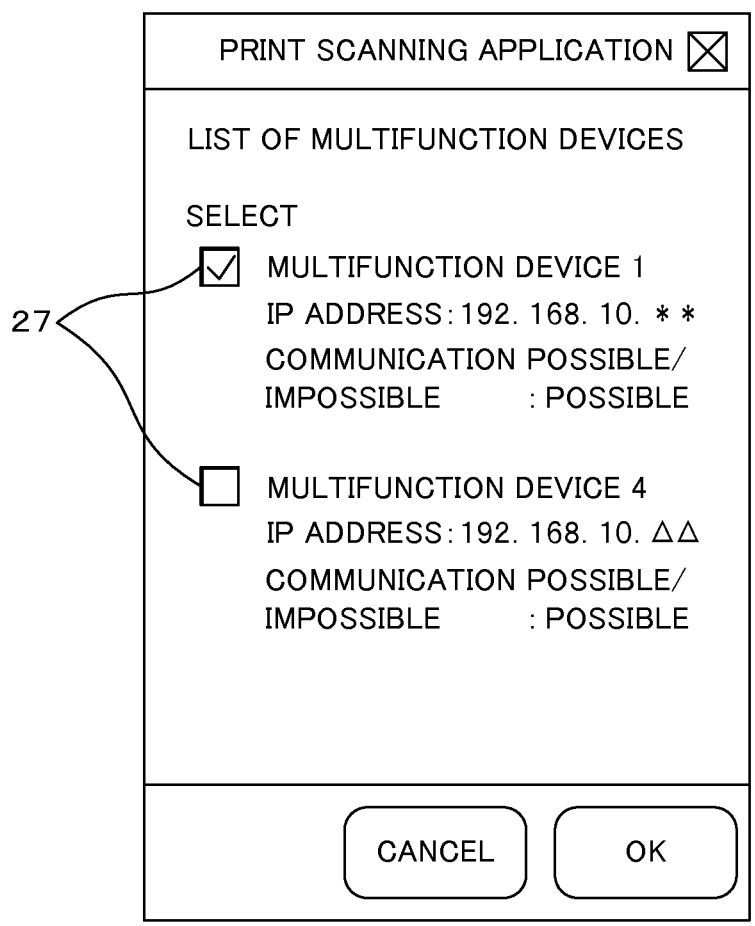
FIG. 8 is an explanatory view illustrating an example of a screen on which a list of multifunction devices is displayed.

When the user touches the touch panel on the multifunction device icon 26 while the main screen in FIG. 6 is displayed, the list of multifunction devices is displayed. FIG. 8 is an explanatory view illustrating an example of a screen on which the list of multifunction devices is displayed. The control unit 20 confirms whether or not communication is possible for each of the multifunction devices 1 and 4 obtained at step S1, and outputs the list of identification information of the multifunction device 1 or 4. The example in FIG. 8 shows the IP addresses of the multifunction devices 1 and 4 as well as whether or not communication is possible for each device. The example in FIG. 8 also shows the radio buttons 27 in a selectable manner for selecting each of the devices.

It is assumed that the user selected the multifunction device 1 from the list of the multifunction devices shown in FIG. 8. The description continues by returning to the flowchart illustrated in FIGS. 3 to 5.

The control unit 20 creates one profile based on the destination information for the information terminal device 2 itself obtained at step S4 and the setting information obtained at step S5 (step S8). The control unit 20 transmits, to the multifunction device 1 specified by the selected identification information, the created profile as well as a request for registering the profile, through the communication unit 23 (step S9).

After step S8, the control unit 20 outputs a screen, showing that the request for registering the profile is being sent to the multifunction device 1, to the display unit 21*a* (step S10). FIG. 9 is an explanatory view illustrating an example of the screen showing that registering of a profile is being requested. FIG. 9 shows the information of the multifunction device 1 to which the request for registering a profile is sent, as well as an image and a sentence indicating that the request for registering is being made.

Meanwhile, at the multifunction device 1, the communication unit 13 receives a profile and a request for registering the profile (step S11). The control unit 10 judges whether or not it is possible to scan (generate image data) based on the setting information of the profile received through the communication unit 13 and to transmit the image data based on the destination information (step S12). At step S12, if it is judged that the scanning and transmission based on the received profile are not possible (S12: NO), the control unit 10 transmits the result (failure) of the judgment on whether or not the profile can be registered, through the communication unit 13, to the information terminal device 2 as a response to the request for registering (step S13). In such a case, the processing is terminated here.

At step S12, if it is judged that the scanning and transmission are possible (S12: YES), the control unit 10 stores the profile received through the communication unit 13 in the storage unit 12 (step S14). The control unit 10 transmits, to the information terminal device 2 as a response to the request for registering, the result indicating whether or not the received profile is stored in the storage unit 12, i.e. the result (success) of the judgment on whether or not the profile can be registered at step S12 and step S14 (step S15). The control unit 10 then outputs destination information and setting information included in the received profile to the display unit 11*a* of the input/output unit 11 (step S16).

Here, an example of a screen displayed on the display unit 11*a* of the input/output unit 11 in the multifunction device 1 is shown. FIG. 10 is an explanatory view illustrating an example of a main screen displayed on the display unit 11*a* of the multifunction device 1. As illustrated in FIG. 10, the main screen shows, for example, an operation screen corresponding to the function of "mobile transmission" by a tab 110 in addition to the operation screens corresponding to the functions of "copy" and "facsimile." When the user touches the touch panel on the tab indicating "mobile transmission" displayed on the display unit 11*a*, the input unit 11*b* detects this and the control unit 10 can display the operation screen for "mobile transmission" on the display unit 11*a*. Here, when the control unit 10 receives a profile through the communication unit 13 during the waiting state where the main screen is being displayed, the control unit 10 makes the display unit 11*a* display the operation screen for "mobile transmission."

FIG. 11 is an explanatory view illustrating an example of the operation screen for "mobile transmission." As illustrated in FIG. 11, on the operation screen for "mobile transmission," user names for the destination's identification information included in the profile received through the communication unit 13 are so displayed as to be selectable as icons 111, 112 and 113. When the control unit 10 receives profiles from different information terminal devices 2, as illustrated in FIG. 11, the control unit 10 outputs, to the display unit 11*a*, the list of identification information (here, user names) for the destinations included in the respective profiles. In FIG. 11, the control unit 10 receives profiles from the information terminal devices 2 owned by a user A, user B and user C, respectively.

It is noted that, in Embodiment 1, the user name is employed as the identification information of destination, as shown in FIG. 11. The present invention is, however, not limited thereto but may, of course, employ any other information such as a name (nickname), model number, serial number applied to the information terminal device 2 as long as the information can identify the information terminal device 2.

When the user touches the touch panel on any one of the icons 111, 112 and 113 of user names in the list displayed on the display unit 11*a*, the input unit 11*b* detects the touched icon and notifies the control unit 10 of it. The control unit 10 specifies which user was touched, recognizes that the specified user is selected, and outputs setting information transmitted with the user name (identification information of destination) of the selected user.

It is assumed here that a user, for example, the "user C" touches the touch panel on the icon 113 of the "user C" in the list shown in FIG. 11 so as to receive image data obtained by reading a desired document at the information terminal device 2, in accordance with the profile transmitted from the information terminal device 2 by the user's operation.

FIG. 12 is an explanatory view illustrating an example of display of setting information. FIG. 12 shows setting information of the image data to be received by the information terminal device 2 owned by the "user C." In the example shown in FIG. 12, as the setting information corresponding to the information terminal device 2 owned by the "user C," information such as 200 dpi for the resolution, color for the color/monochrome setting, a pdf file for the file type are output and displayed. As for the resolution, color/monochrome setting and file type, pull-down menus 114, 115 and 116 for showing options are displayed so as to be able to change them from the content of the received setting information.

When the destination identification information and setting information included in the received profile are output at step S16, the control unit 10 of the multifunction device 1 may skip the screen example shown in FIG. 11 and directly show the screen example shown in FIG. 12 from the state where the main screen in FIG. 10 is displayed. The control unit 10 may display the screen shown in FIG. 12 for a predetermined period of time since a profile is received, and returns to the main screen of FIG. 10 after the predetermined period of time has elapsed, and may display the screen as shown in the screen example of FIGS. 11 and 12 in response to the tab selecting operation by the user.

Figure 14:
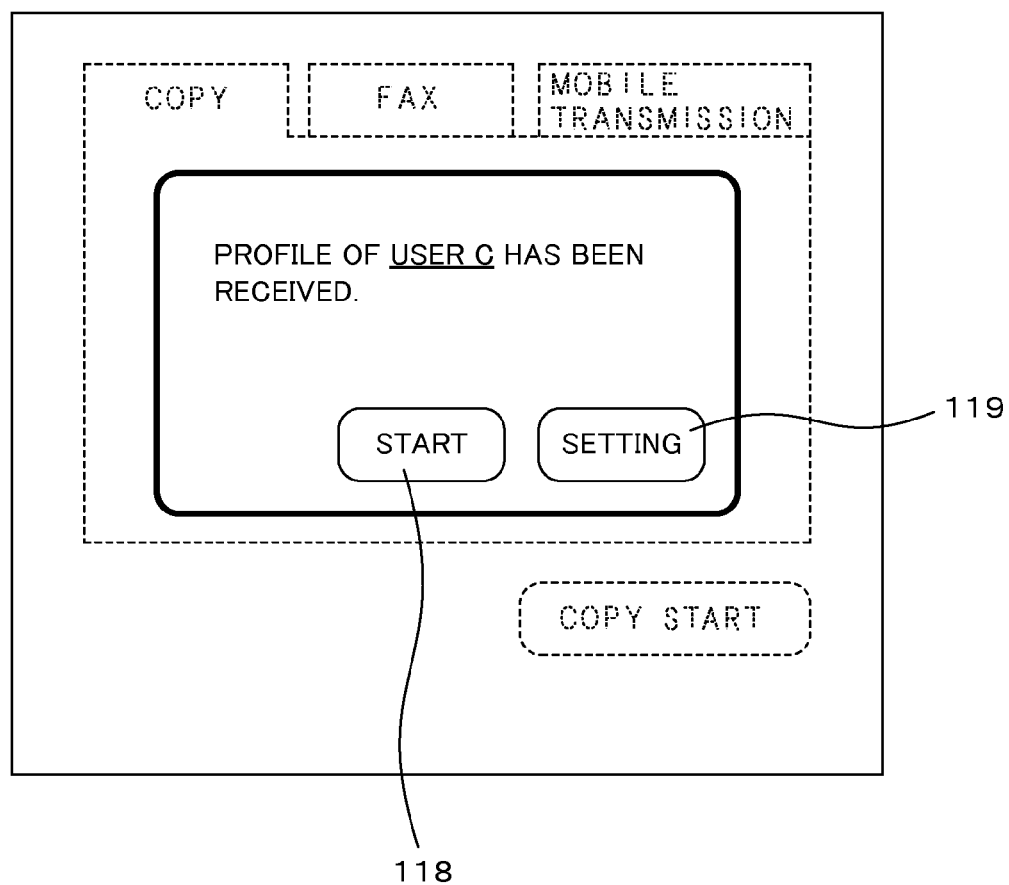
FIG. 14 is an explanatory view illustrating another example of the main screen of the multifunction device.

Furthermore, when a profile is received while the main screen in FIG. 10 is being displayed, the control unit 10 may output the fact that the profile is received as well as the destination information of the received profile to a vacant space in the main screen. FIG. 13 is an explanatory view illustrating another example of the main screen of the multifunction device 1. The example shown in FIG. 13 illustrates the case where the fact that a profile has been received as well as a user name among the destination information of the received profile are output to a vacant space of the main screen shown in FIG. 10. In FIG. 13, a setting icon 117 for changing the setting information in the profile is displayed. In addition, when receiving a profile, the control unit 10 may output the fact that the profile has been received by superimposing it onto the main screen, and may work to display a start icon or the like for immediate start. FIG. 14 is an explanatory view illustrating another example of the main screen of the multifunction device 1. In the example shown in FIG. 14, by superimposing onto the main screen shown in FIG. 10, the fact that a profile has been received as well as a user name among the destination information of the received profile are output, and also a start icon 118 and the setting icon 119 for changing the setting are displayed.

Description continues with reference to the flowchart shown in FIGS. 3 to 5 again.

The control unit 10 appropriately accepts a selection and setting for the destination identification information and setting information that are output (step S17). In other words, the user is able to change each item in FIG. 12 as necessary. Since step S17 is performed only when needed, the control unit 10 may proceed to the next step S18 without performing step S17.

The control unit 10 determines whether or not an instruction for executing scanning has been provided (step S18). At step S18, the control unit 10 detects at the input unit 11b whether or not the touch panel on the "start" icon (see FIG. 12) displayed on the display unit 11a of the input/output unit 11 is touched, and if it is detected that the touch panel is touched, judges that the instruction for executing scanning has been provided.

If it is judged that the instruction for executing scanning has not been provided (S18: NO), the control unit 10 returns the processing to step S18, and waits until the "start" icon is touched and it is judged that the instruction for executing scanning is provided.

If it is judged that the instruction for executing scanning has been provided (S18: YES), the control unit 10 makes the image reading unit 14 execute scanning (reading) based on the setting information (step S19), generates image data based on the setting information (step S20), and transmits the generated image data to the information terminal device 2 based on the destination information (step S21).

In the information terminal device 2, after transmitting the created profile as well as the request for registering the profile through the communication unit 23 at step S9, the control unit 20 judges whether or not the registering of the profile succeeded (step S22). At step S22, the control unit 20 judges, specifically, whether or not a response (success) to the request for registering a profile is received from the multifunction device 1. When it is judged that the registering of the profile failed (S22: NO), the control unit 20 outputs an error report to the display unit 21a (step S23), and terminates the processing. The error report may be output by sound.

Figure 15:
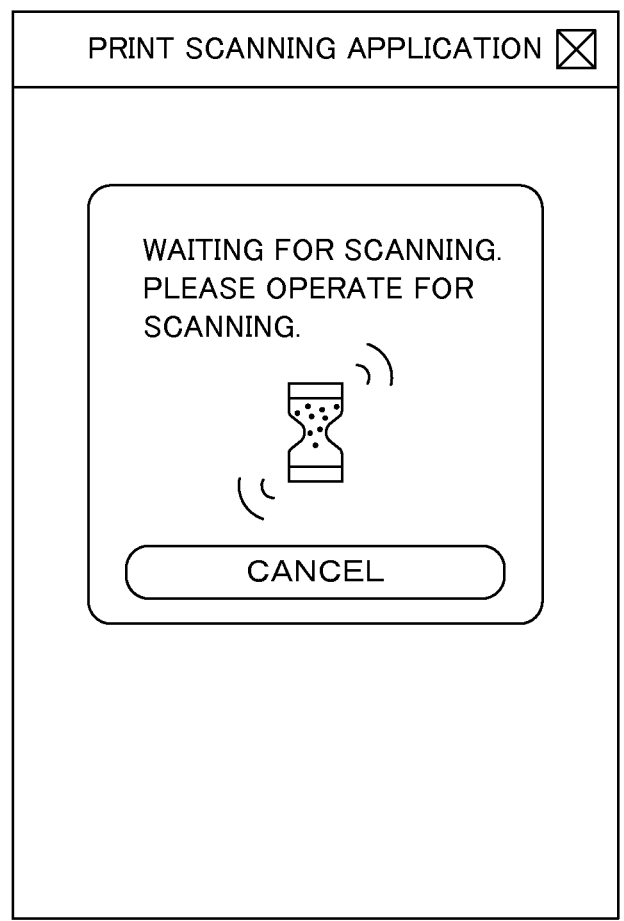
FIG. 15 is an explanatory view illustrating an example of a screen in a state of waiting for the start of image data reception.

At step S22, if it is judged that the registering of a profile succeeded (S22: YES), the control unit 20 judges whether or not reception, through the communication unit 23, of image data from the multifunction device 1 is started (step S24). If it is judged that reception of image data is not started (S24: NO), the control unit 20 becomes in a state of waiting for the start of image data reception. Here, the control unit 20 outputs, to the display unit 21a, a screen indicating that it is in the state of waiting for the start of image data reception (step S25), and returns the processing to step S24. FIG. 15 is an explanatory view illustrating an example of a screen in the state of waiting for the start of image data reception. FIG. 15 shows an image and a sentence indicating that it is waiting for scanning (reading) execution.

Figure 16:
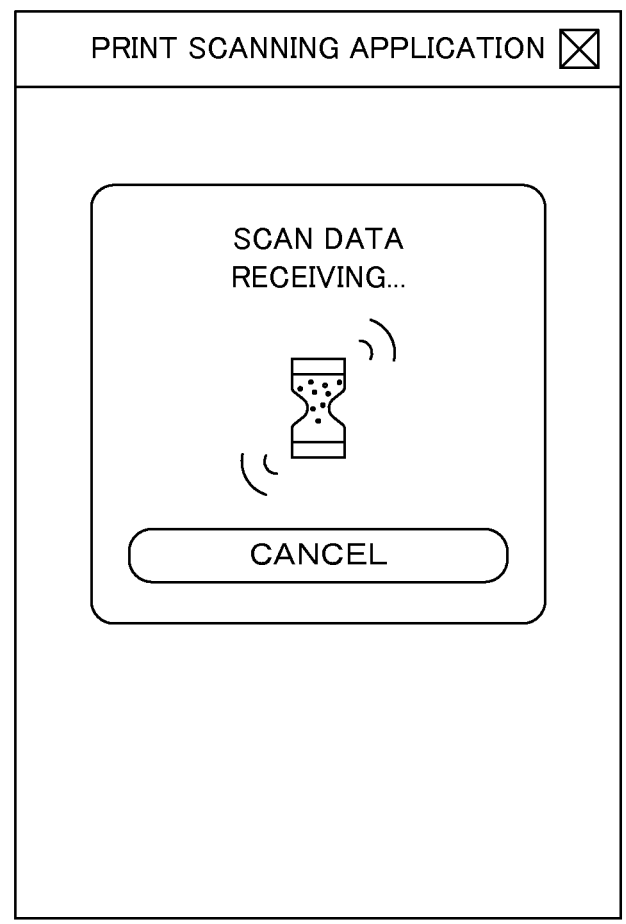
FIG. 16 is an explanatory view illustrating an example of a screen in a state of waiting for the completion of image data reception.

If it is judged that the reception is started at step S24 (S24: YES), the control unit 20 temporarily stores the received image data in a RAM in sequence (step S26), and judges whether or not reception is completed (step S27). If it is judged that reception is not completed at step S27 (S27: NO), the control unit 20 becomes in the state of waiting for completion of image data reception. Here, the control unit 20 outputs a screen indicating that it is in the state of waiting for completion of image data reception to the display unit 21a (step S28), and returns the processing to step S26. FIG. 16 is an explanatory view illustrating an example of the screen in the state of waiting for the completion of image data reception. FIG. 16 shows an image and a sentence indicating that the scan data (image data) is being received.

If it is judged, at step S27, that reception has not completed and has failed due to, for example, disruption of communication, the control unit 20 outputs an error report to the display unit 21a (S23), and terminates the processing. The error report may be output by sound.

If it is judged that reception has completed at step S27 (S27: YES), the control unit 20 saves the image data temporarily stored in the RAM into a flash memory of the storage unit 22 (step S29). Here, the control unit 20 outputs a screen indicating that reception has completed to the display unit 21a (step S30).

Figure 17:
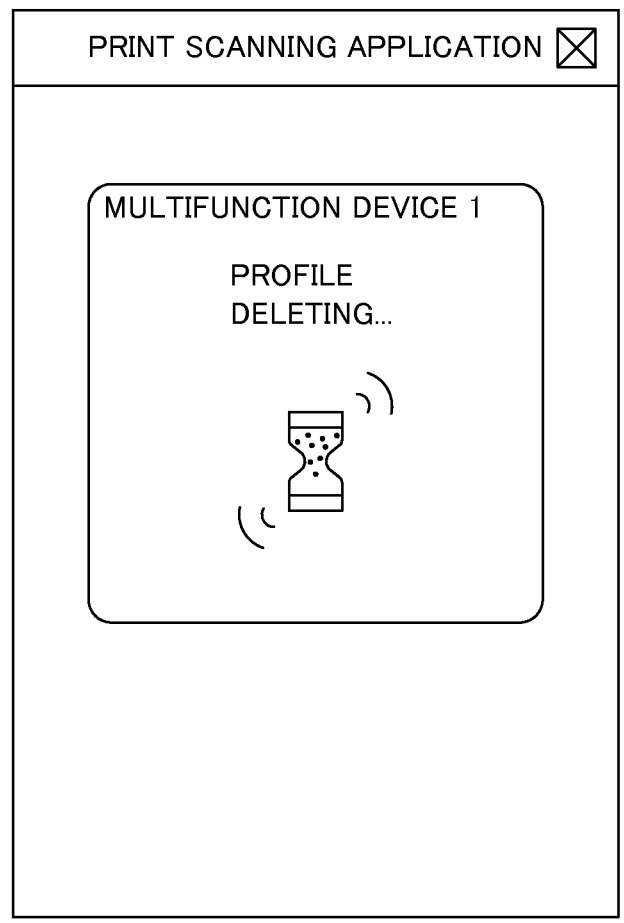
FIG. 17 is an explanatory view illustrating an example of a screen showing that deleting of a profile is being requested.

Subsequently, the control unit 20 transmits a request for deleting the profile transmitted to the multifunction device 1, from the communication unit 23 to the multifunction device 1 (step S31). The control unit 20 outputs, to the display unit 21a, a screen indicating that the request for deleting the profile is being transmitted to the multifunction device 1 (step S32). FIG. 17 is an explanatory view illustrating an example of the screen showing that deleting of a profile is being requested. FIG. 17 shows an image and a sentence indicating that deleting of a profile is being requested.

In the multifunction device 1 to which the request for deleting a profile is transmitted, the communication unit 13 receives a request for deleting the profile (step S33). The control unit 10 deletes the profile stored in the storage unit 12, i.e. deletes destination information and setting information, based on the request for deleting the profile received through the communication unit 13 (step S34), and transmits a response to the information terminal device 2 (step S35).

In the information terminal device 2, the control unit 20 receives the response to the request for deleting the profile (step S36), outputs the fact that deleting is completed to the display unit 21a (step S37), and terminates the processing of receiving image data.

In the processing described above, the processing procedure that requires user's operation includes only the processing of selecting the multifunction device 1 corresponding to step S7 and the processing of starting scanning at the multifunction device 1 corresponding to step S19. Though the processing of editing the setting information for a profile may also be necessary at step S6, it is not required when the default setting is used. Alternatively, in the information terminal device 2, as the setting information is saved in the storage unit 22 which is a non-volatile memory, from the next time on, if the connection with the multifunction device 1 corresponding to the setting information is confirmed, it is possible to automatically receive image data generated for the information terminal device 2 and make the display unit 21a display the image data only by executing the scanning procedure at step S19.

It is noted that the configuration is employed in which, at steps S31 to S37, the destination information and setting information included in a profile are deleted at the multifunction device 1 in response to a request from the information terminal device 2. Since it is the setting for the temporarily-connected information terminal device 2, the setting information is not always used in the multifunction device 1. The deleting is to prevent such temporary setting from remaining permanently in the multifunction device 1 and accumulating. The present invention is, however, not limited thereto, but may also have a configuration without a deleting procedure. In the case where the number of information terminal devices 2 connected to the network N is small, such as the setting for transmitting image data to an information terminal device 2 owned by a family member in a local network connected to the multifunction device 1 used in a household, the state where the destination information and setting information for each information terminal device 2 remain stored in the multifunction device 1 may be preferable.

Figure 18:
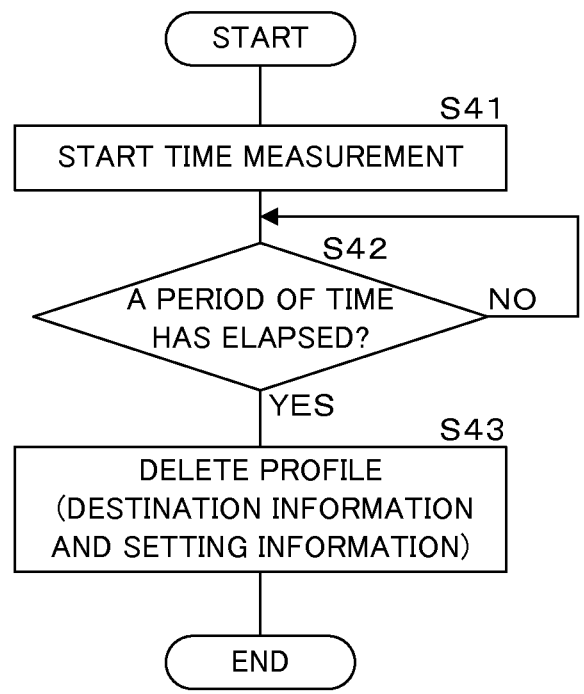
FIG. 18 is a flowchart illustrating another example of a processing procedure related to deleting of a profile.

At step S31 to S37, the configuration is employed in which the destination information and setting information included in a profile are deleted in response to the deleting request from the information terminal device 2. The present invention is, however, not limited thereto, but may have a configuration in which the processing as described below is performed in the multifunction device 1 after step S21, for example. FIG. 18 is a flowchart illustrating another example of a processing procedure related to deleting of a profile. The processing procedure illustrated in FIG. 18 is performed in place of steps S31 to S37 in the processing procedure illustrated in the flowchart of FIGS. 3 to 5. The control unit 10 of the multifunction device 1 starts the time measurement (step S41), and judges whether or not a predetermined period of time, for example, twenty minutes, has elapsed (step S42). If it is determined that a predetermined period of time has not elapsed (S42: NO), the control unit 10 returns the processing to step S42, and waits until the predetermined period of time has elapsed. If it is judged that a predetermined period of time has elapsed (S42: YES), the control unit 10 deletes the stored destination information and corresponding setting information from the storage unit 12 (step S43), and terminates the processing. Accordingly, even if no deleting request is transmitted from the information terminal device 2, such information is automatically deleted, which can avoid excessive destination information and setting information remaining stored in the multifunction device 1.

It is to be understood that the examples of screen displays shown in FIGS. 6 to 17 are mere examples, and other screen configurations may also be employed. An example as described below may also be possible.

Other Configuration Example

In the case where the multifunction device 1 has a function of transmitting, attaching to an electronic mail, image data generated by scanning or a function of FTP transmission (function of scan transmission) as a prior function, the processing according to the present invention may be performed in addition to the function of scan transmission.

In such a case, the storage unit 12 of the multifunction device 1 stores, in advance, address information for the functions of facsimile, electronic mail and FTP communication. The control unit 10 of the multifunction device 1 realizes the processing of storing destination information in the profile at step S14 in the processing procedure shown in FIGS. 3 to 5, by additional update to the address information. The control unit 10 then stores the setting information received together with the destination information added to the address information by linking it to the destination information in the address information. Here, the control unit 10 may store, for each destination of address information, a transmission method and a destination type in association with one another. Among the address information in the conventional scanning transmission function, "electronic mail" is associated and stored as the transmission method for the destination transmitted with an electronic mail, "FTP" as the transmission method and "PC" as the type of destination are associated and stored for the destination in the FTP transmission, and "mobile" is associated and stored as the type of destination when the information terminal device 2 and the like performing transmission from the communication unit 13 via wireless transmission, a so-called smartphone, is used as a destination. When address information is output at step S16, a color, an icon or the like for identifying the transmission method or destination type is preferably output together as the identification information of a destination.

FIG. 19 is an explanatory view illustrating another example of the main screen displayed on the display unit 11a of the multifunction device 1. As illustrated in FIG. 19, on the main screen in this another example, in addition to the functions of copying and facsimile, an operation screen corresponding to a "scan" function is displayed as a tab. When the user touches the touch panel on a tab 120 indicated as "scan" displayed on the display unit 11a, the input unit 11b detects this and the control unit 10 makes the display unit 11a display the operation screen for "scan."

Figure 20:
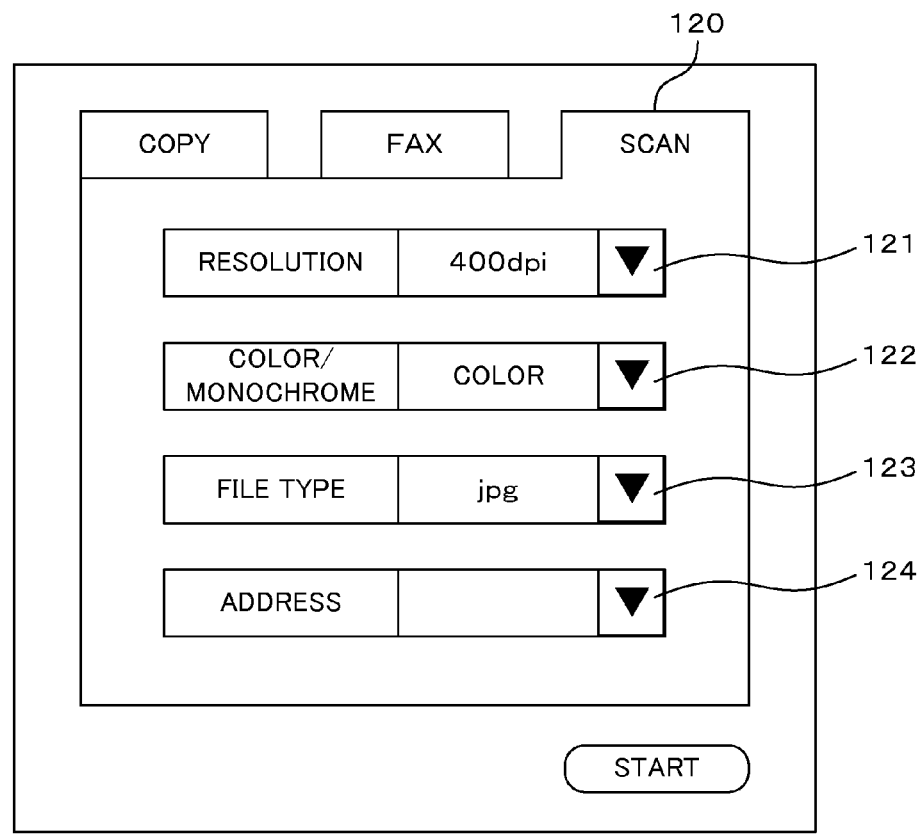
FIG. 20 is an explanatory view illustrating another example of an operation screen of "scanning"

FIG. 20 is an explanatory view illustrating another example of the operation screen of "scan." As shown in FIG. 20, a setting condition for executing scanning is displayed on the operation screen of "scan." As a default condition of scanning, the resolution of 400 dpi and color are set for executing scanning, while a jpg file is set as the file type, which are output and displayed. Pull-down menus 121, 122 and 123 for displaying options are displayed so as to change each of the resolution, color/monochrome setting and file type. In implementing the present invention, a pull-down menu 124 of "address book" for selecting an address of generated image data is additionally displayed.

FIG. 21 is an explanatory view illustrating an example of a screen on which options in the pull-down menu 124 in FIG. 20 are shown. As shown FIG. 21, for a destination, in addition to the names of the devices on the network N, "user C" is displayed as the destination information included in the profile received from the information terminal device 2. Moreover, for the destination information of "user C," hatching and an icon indicating "mobile" are displayed. By touching the touch panel on the "user C" in the pull-down menu 124, the user can select to transmit image data to the information terminal device 2 having the identification information of "user C."

Figure 22:
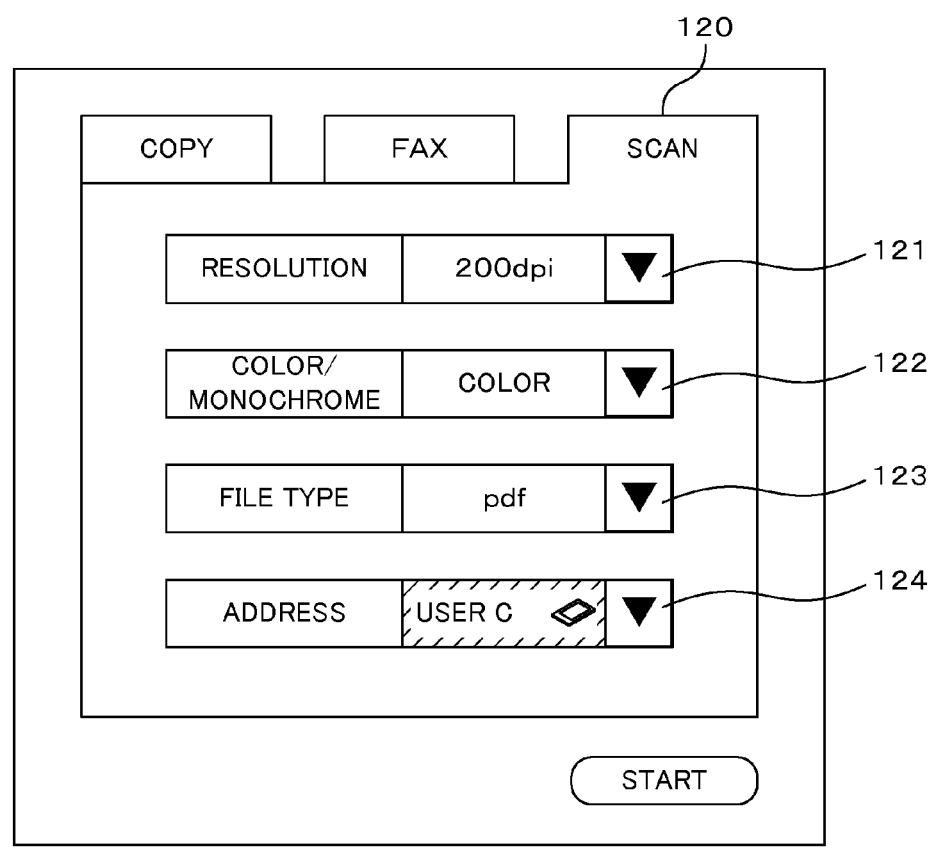
FIG. 22 is an explanatory view illustrating an example of a screen when "user C" is selected in FIG. 21.

FIG. 22 is an explanatory view illustrating an example of a screen when "user C" is selected in FIG. 21. FIG. 22 shows that, when "user C" is selected, setting information associated with the destination information of "user C" is reflected, so that scanning is executed with the resolution of 200 dpi and color, while image data is generated as a pdf file. As the processing of outputting setting information at step S16, the control unit 10 outputs setting information associated with the identification information of the selected destination. It is noted that each of the resolution, color/monochrome setting and file type included in the corresponding setting information may also be changed by the user touching the touch panel on the pull-down menus 121, 122 and 123.

As such, the configuration in that transmission to the information terminal device 2 such as a smartphone can be realized only by selecting from the pull-down menus further improves user operability.

It should be noted that the embodiments disclosed herein are illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

The invention claimed is:

1. An image processing system comprising: one or more image processing devices having a communication unit and an image reading unit that generates image data, and transmitting the generated image data through the communication unit; and an image receiving device having a communication unit, and receiving the generated image data transmitted by the communication unit of the one or more image processing devices, wherein
the image receiving device includes:
a control unit that executes:
a step of obtaining destination information of the image receiving device;
a step of obtaining setting information settable when image data to be received is generated;
a step of transmitting, through the communication unit of the image receiving device, the destination information and the setting information to any one of the image processing devices; and
a step of transmitting to the any one of the image processing devices, through the communication unit of the image receiving device, a request for deleting the transmitted destination information, and
the one or more image processing devices including a control unit that executes:
a step of receiving, through the communication unit of the one or more image processing devices, the destination information and setting information transmitted from the image receiving device;
a step of generating, by the image reading unit, image data based on the received setting information; and
a step of transmitting, through the communication unit of the one or more image processing devices, the generated image data to a destination indicated by the received destination information, and
a storage unit that stores the received destination information, and
wherein
the control unit of the image processing device further executes:
a step of receiving, through the communication unit, the request transmitted from the image receiving device; and
a step of deleting or prohibiting reading of the destination information from the storage unit when receiving the request; and
wherein the functions performed by the communication unit, image reading unit, control unit, and storage unit are achieved using a CPU.

2. The image processing system according to claim 1, comprising a plurality of the image processing devices, wherein
the control unit of the image receiving device further executes:
a step of searching for an image processing device of the one or more image processing devices capable of communicating through the communication unit and of generating image data based on the setting information;
a step of outputting, by an input/output unit, a result of searching; and
a step of accepting a selection of the outputted image processing device from the result of searching.

3. The image processing system according to claim 1, wherein
the control unit of the one or more image processing devices further executes
a step of deleting or prohibiting reading of the destination information from the storage unit after a period of time has elapsed since the image data is transmitted to a destination indicated by the destination information.

4. An image receiving device that includes a communication unit and receives image data through the communication unit, comprising:
a control unit that executes
a step of obtaining destination information of the image receiving device;
a step of obtaining setting information settable when image data to be received by the image receiving device is generated;
a step of transmitting, through the communication unit, the destination information and the setting information; and
a step of transmitting, through the communication unit, a request for deleting the transmitted destination information; and
wherein the functions performed by the communication unit and control unit are achieved using a CPU.

5. The image receiving device according to claim 4, wherein the control unit further executes:
- a step of searching for a device capable of communicating through the communication unit and of generating image data based on the obtained setting information;
- a step of outputting, by an input/output unit, a result of searching; and
- a step of accepting a selection of a device from the output result of searching.

6. An image processing device that includes a communication unit and an image reading unit that generates image data, and transmits the generated image data through the communication unit, comprising a control unit that executes:
- a step of receiving, through the communication unit, destination information for image data and setting information settable when the image data is generated;
- a step of generating, by the image reading unit, image data based on the received setting information; and
- a step of transmitting, through the communication unit, the generated image data to a destination indicated by the received destination information, and
- a storage unit that stores the received destination information, and wherein the control unit further executes:
- a step of receiving, through the communication unit, a request for deleting the received destination information; and
- a step of deleting or prohibiting reading of the destination information from the storage unit when receiving the request; and
- wherein the functions performed by the communication unit, image reading unit, control unit, and storage unit are achieved using a CPU.

7. An image processing method in which one or more image processing devices having a communication unit and an image reading unit that generates image data transmits the generated image data through the communication unit, and an image receiving device having a communication unit receives the generated image data transmitted from the image processing device through the communication unit, comprising:
- a step of obtaining, by the image receiving device, destination information of the image receiving device;
- a step of obtaining, by the image receiving device, setting information settable when image data to be received is generated;
- a step of transmitting, through the communication unit of the image receiving device, the destination information and the setting information to any one of the image processing devices;
- a step of receiving, through the communication unit of the any one of the image processing devices, the destination information and setting information transmitted from the image receiving device,
- a step of generating, by the image reading unit of the any one of the image processing devices, image data based on the received setting information;
- a step of transmitting, through the communication unit of the image processing device, the generated image data to a destination indicated by the received destination information;
- a step of transmitting to the any one of the image processing devices, through the communication unit of the image receiving device, a request for deleting the destination information transmitted to the image processing device;
- a step of storing, by the any one of the image processing devices, the received destination information in a storage unit;
- a step of receiving, through the communication unit of the any one of the image processing devices, the request transmitted from the image receiving device; and
- a step of deleting or prohibiting reading of the destination information from the storage unit when receiving the request by the any one of the image processing devices.

* * * * *